United States Patent
Shepherd et al.

(10) Patent No.: US 10,765,171 B2
(45) Date of Patent: Sep. 8, 2020

(54) SHOE HAVING CUSHION WITHIN HEEL MEMBER

(71) Applicant: Cole Haan LLC, New York, NY (US)

(72) Inventors: Aubert Shepherd, Greenland, NH (US); Raghu Yalamanchili, Dongguan (CN); Narendran Jayavel, Vellore (IN)

(73) Assignee: COLE HAAN LLC, New York, NY (US)

( * ) Notice: Subject to any disclaimer, the term of this patent is extended or adjusted under 35 U.S.C. 154(b) by 749 days.

(21) Appl. No.: 14/996,916

(22) Filed: Jan. 15, 2016

(65) Prior Publication Data

US 2017/0202303 A1    Jul. 20, 2017

(51) Int. Cl.
*A43B 13/18*    (2006.01)
*A43B 13/12*    (2006.01)
(Continued)

(52) U.S. Cl.
CPC ............ *A43B 13/186* (2013.01); *A43B 7/141* (2013.01); *A43B 13/12* (2013.01); *B29C 44/12* (2013.01); *B29C 44/1271* (2013.01); *B29C 45/40* (2013.01); *B29D 35/08* (2013.01); *A43B 3/0078* (2013.01); *A43B 7/144* (2013.01); *A43B 7/1445* (2013.01); *A43B 13/04* (2013.01);
(Continued)

(58) Field of Classification Search
CPC ......... A43B 13/12; A43B 13/02; A43B 13/08; A43B 13/188; A43B 15/00; A43B 13/186; A43B 21/26; A43B 13/04; A43B 21/20; A43B 3/0078; A43B 7/144; A43B 7/1445; A43B 7/141; A43B 13/41; A43B 13/14; A43B 23/22; A43B 23/24; A43B 9/04; A43B 17/00; A43B 17/14; A43B 21/24; A43B 21/36; B29L 2031/50; B29C 44/12; B29C 45/40; B29C 44/1271; B29C 44/08; B29K 2075/00; B29K 2105/04; B29K 2101/12; B29K 2675/00; B29D 35/061; B29D 35/122; B29D 35/08; B29D 35/081
USPC ....................................... 12/147 B
See application file for complete search history.

(56) References Cited

U.S. PATENT DOCUMENTS 482,561 A    9/1892  Parkison
930,990 A    8/1909  Rogers
(Continued)

FOREIGN PATENT DOCUMENTS

CA    2188847 A1    5/1997
CN    1102839 C     11/1997
(Continued)

*Primary Examiner* — Nathan E Durham
*Assistant Examiner* — Abby M Spatz
(74) *Attorney, Agent, or Firm* — Thompson Coburn LLP

(57) ABSTRACT

A shoe comprising a sole and an upper secured to the sole. The sole has a lower sole member, a heel member, a shank member, a heel cushion, and a foot pad. The heel member extends downwardly from the lower sole member. The heel member includes a heel outer peripheral surface and an open top heel cavity. The lower sole member includes a top surface and a lower sole cavity extending downwardly from the top surface. The shank member has a shank midfoot portion and a shank heel portion. The shank midfoot portion is in the lower sole cavity and the shank heel portion is in the heel cavity. The heel cushion is in the heel cavity. The shank heel portion is sandwiched between the heel cushion and the heel member.

23 Claims, 10 Drawing Sheets

(51) Int. Cl.
- *A43B 23/22* (2006.01)
- *B29D 35/08* (2010.01)
- *B29C 44/12* (2006.01)
- *A43B 7/14* (2006.01)
- *B29C 45/40* (2006.01)
- *B29K 101/12* (2006.01)
- *B29C 44/08* (2006.01)
- *B29D 35/06* (2010.01)
- *B29D 35/12* (2010.01)
- *A43B 3/00* (2006.01)
- *A43B 13/41* (2006.01)
- *A43B 23/24* (2006.01)
- *A43B 13/04* (2006.01)
- *A43B 21/20* (2006.01)
- *A43B 21/26* (2006.01)
- *B29K 75/00* (2006.01)
- *B29K 675/00* (2006.01)
- *B29L 31/50* (2006.01)

(52) U.S. Cl.
CPC ............ *A43B 13/188* (2013.01); *A43B 13/41* (2013.01); *A43B 21/20* (2013.01); *A43B 21/26* (2013.01); *A43B 23/22* (2013.01); *A43B 23/24* (2013.01); *B29C 44/08* (2013.01); *B29D 35/061* (2013.01); *B29D 35/122* (2013.01); *B29K 2075/00* (2013.01); *B29K 2101/12* (2013.01); *B29K 2675/00* (2013.01); *B29L 2031/50* (2013.01)

(56) References Cited

U.S. PATENT DOCUMENTS

| | | | |
|---|---|---|---|
| 968,020 A | 8/1910 | Yandoli | |
| RE13,928 E | 6/1915 | Ferguson | |
| 1,718,906 A | 6/1929 | Hurley | |
| 1,724,349 A | 8/1929 | Haag | |
| 1,803,236 A | 4/1931 | Coulson | |
| 1,973,105 A | 9/1934 | Rohn et al. | |
| 2,045,844 A | 6/1936 | Eversion | |
| 2,440,362 A * | 4/1948 | Braun | A43B 9/14 12/142 F |
| 2,532,742 A | 12/1950 | Stainer | |
| 2,901,841 A | 9/1959 | Joiner et al. | |
| 3,028,690 A * | 4/1962 | Bailey | A43B 15/00 36/14 |
| 3,190,016 A | 6/1965 | Hansjosten | |
| 4,041,620 A | 8/1977 | Anderson | |
| 4,043,058 A * | 8/1977 | Hollister | A43B 5/00 36/102 |
| 4,067,125 A | 1/1978 | Greene, Sr. | |
| 4,214,335 A * | 7/1980 | Ughi | B29D 35/124 12/146 BR |
| 4,835,884 A | 6/1989 | Bianchini et al. | |
| 5,435,077 A | 7/1995 | Pyle | |
| 6,050,001 A | 4/2000 | Ditrtrich | |
| 6,122,884 A | 9/2000 | Talwar | |
| 6,145,220 A | 11/2000 | Johnson, Jr. et al. | |
| 6,497,057 B1 | 12/2002 | Lee et al. | |
| 6,519,874 B1 | 2/2003 | Dean | |
| 6,660,205 B1 | 12/2003 | Harkins, Sr. | |
| 6,802,138 B2 | 10/2004 | McManus et al. | |
| 7,056,459 B2 | 6/2006 | Park | |
| 7,325,334 B2 | 2/2008 | Lebo | |
| 7,380,353 B2 | 6/2008 | Feller et al. | |
| 7,946,060 B2 | 5/2011 | Rosenbaum | |
| 8,056,261 B2 | 11/2011 | Nakano et al. | |
| 8,127,468 B2 | 3/2012 | Morgan | |
| 8,381,416 B2 | 2/2013 | Geer et al. | |
| 8,984,772 B2 | 3/2015 | Mazzarolo | |
| 9,021,721 B2 | 5/2015 | McCarron | |
| 2003/0150131 A1 | 8/2003 | McManus et al. | |
| 2007/0011918 A1 | 1/2007 | Snow et al. | |
| 2007/0017122 A1* | 1/2007 | Feller | A43B 1/0072 36/35 R |
| 2010/0313450 A1 | 12/2010 | Morgan | |
| 2013/0192086 A1* | 8/2013 | Tawney | A43B 9/00 36/12 |
| 2017/0202303 A1 | 7/2017 | Shepherd et al. | |

FOREIGN PATENT DOCUMENTS

| | | |
|---|---|---|
| CN | 100435682 C | 4/2007 |
| CN | 202525244 U | 11/2012 |
| CN | 203137214 U | 8/2013 |
| CN | 205728345 U | 11/2016 |
| WO | 2002102564 A2 | 12/2002 |

* cited by examiner

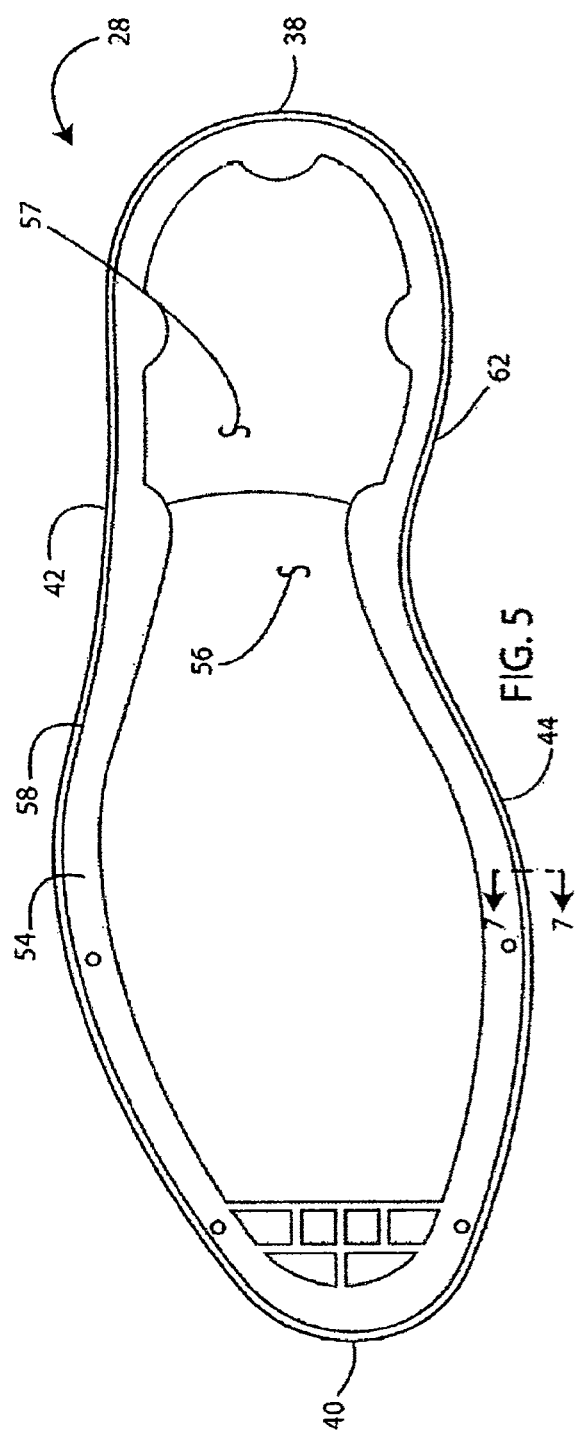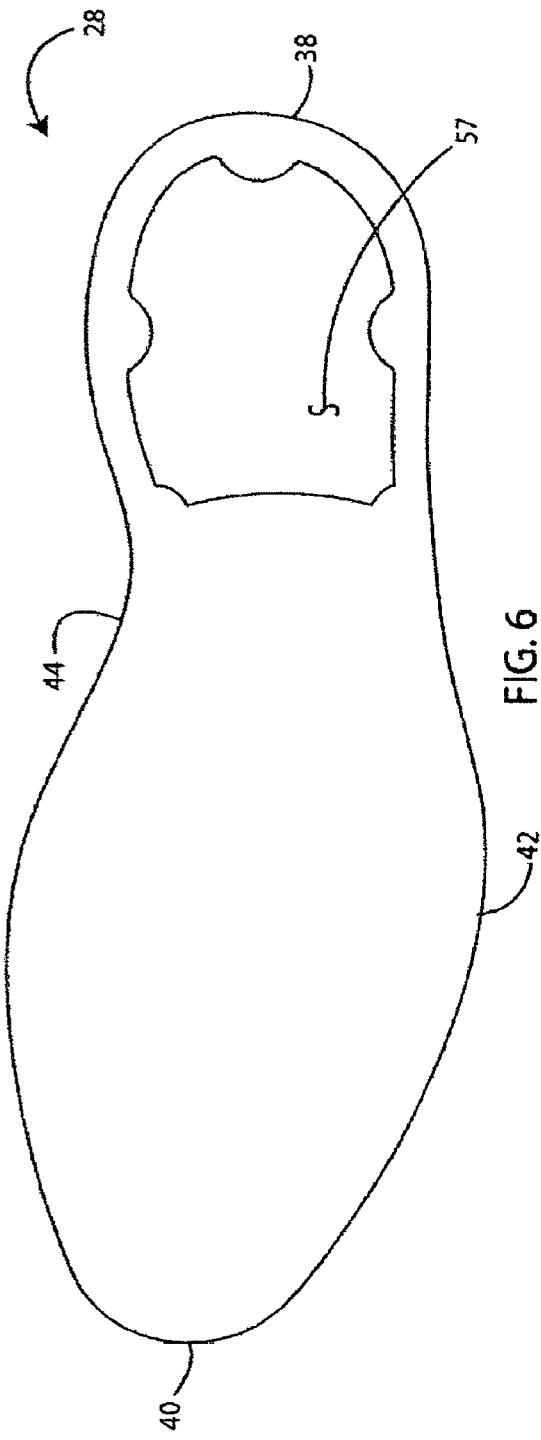

SHOE HAVING CUSHION WITHIN HEEL MEMBER

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

This invention pertains to shoes having heel members.

SUMMARY OF THE INVENTION

One aspect of the invention is a shoe comprising a sole and an upper secured to the sole. The sole extends longitudinally from a sole heel end to a sole toe end and extends transversely from a sole lateral edge to a sole medial edge. The sole includes a heel region, a midfoot region, a ball region and a toe region. The heel region extends longitudinally from the sole heel end to the midfoot region. The midfoot region extends longitudinally from the heel region to the ball region. The ball region extends longitudinally from the midfoot region to the toe region. The toe region extends longitudinally from the ball region to the sole toe end. The sole has a lower sole member, a heel member, a shank member, a heel cushion, and a foot pad. The lower sole member extends from the sole heel end to the sole toe end. The heel member is in the heel region and extends downwardly from the lower sole member. The heel member includes a heel outer peripheral surface and an open top heel cavity. The heel cavity is spaced from the heel outer peripheral surface. The lower sole member includes a top surface and a lower sole cavity extending downwardly from the top surface. The shank member has a shank midfoot portion and a shank heel portion. The shank midfoot portion is in the lower sole cavity and the shank heel portion is in the heel cavity. The heel cushion is in the heel cavity. The shank heel portion is sandwiched between the heel cushion and the heel member. The foot pad extends between the sole heel end and the sole toe end and has a heel pad portion, a midfoot pad portion, a ball pad portion, and a toe pad portion. The heel pad portion overlies and is in contact with the heel cushion. The midfoot pad portion overlies and is in contact with the shank midfoot portion. The midfoot pad portion, the ball pad portion, and the toe pad portion are in the lower sole cavity. The foot pad has a top surface in contact with the upper.

Another aspect of the invention is a shoe comprising a sole and an upper secured to the sole. The sole extends longitudinally from a sole heel end to a sole toe end and extends transversely from a sole lateral edge to a sole medial edge. The sole includes a heel region, a midfoot region, a ball region and a toe region. The heel region extends longitudinally from the sole heel end to the midfoot region. The midfoot region extends longitudinally from the heel region to the ball region. The ball region extends longitudinally from the midfoot region to the toe region. The toe region extends longitudinally from the ball region to the sole toe end. The sole has a lower sole member, a heel member, a shank member, a heel cushion, and a foot pad. The lower sole member extends from the sole heel end to the sole toe end. The heel member is in the heel region and extends downwardly from the lower sole member. The heel member includes a heel outer peripheral surface and an open top heel cavity. The heel cavity is spaced from the heel outer peripheral surface. The lower sole member includes a top surface and a lower sole cavity extending downwardly from the top surface. The shank member has a shank midfoot portion and a shank heel portion. The shank midfoot portion is in the lower sole cavity and the shank heel portion is in the heel cavity. The heel cushion is in the heel cavity. The shank heel portion is sandwiched between the heel cushion and the heel member. The foot pad extends between the sole heel end and the sole toe end and has a heel pad portion, a midfoot pad portion, a ball pad portion, and a toe pad portion. The heel pad portion overlies the heel cushion and the midfoot pad portion overlies the shank midfoot portion. The midfoot pad portion, the ball pad portion, and the toe pad portion are in the lower sole cavity. The foot pad has a top surface in contact with the upper.

Another aspect of the invention is a shoe comprising a sole and an upper secured to the sole. The sole extends longitudinally from a sole heel end to a sole toe end and extends transversely from a sole lateral edge to a sole medial edge. The sole includes a heel region, a midfoot region, a ball region and a toe region. The heel region extends longitudinally from the sole heel end to the midfoot region. The midfoot region extends longitudinally from the heel region to the ball region. The ball region extends longitudinally from the midfoot region to the toe region. The toe region extends longitudinally from the ball region to the sole toe end. The sole has a lower sole member, a heel member, a shank member, and a heel cushion. The lower sole member extends from the sole heel end to the sole toe end. The lower sole member includes a top surface, a bottom surface, and an outer peripheral surface. The lower sole member includes a through opening in the heel region. The opening in the lower sole member is spaced from the outer peripheral surface of the lower sole member. The heel member is in the heel region and extends downwardly from the lower sole member. The heel member includes a heel outer peripheral surface and an open top heel cavity. The heel cavity is spaced from the heel outer peripheral surface and aligned with the opening in the lower sole member. The shank member has a shank midfoot portion. The shank midfoot portion is in the midfoot region and overlies the lower sole member. The heel cushion is in the heel cavity and in the opening in the lower sole member.

Further features and advantages of the present invention, as well as the operation of the invention, are described in detail below with reference to the accompanying drawings.

BRIEF DESCRIPTION OF THE DRAWINGS

FIG. 5 is a top plan view of the lower sole member shown in FIG. 2.

FIG. 6 is a bottom plan view of the lower sole member shown in FIG. 2.

Figure 1:
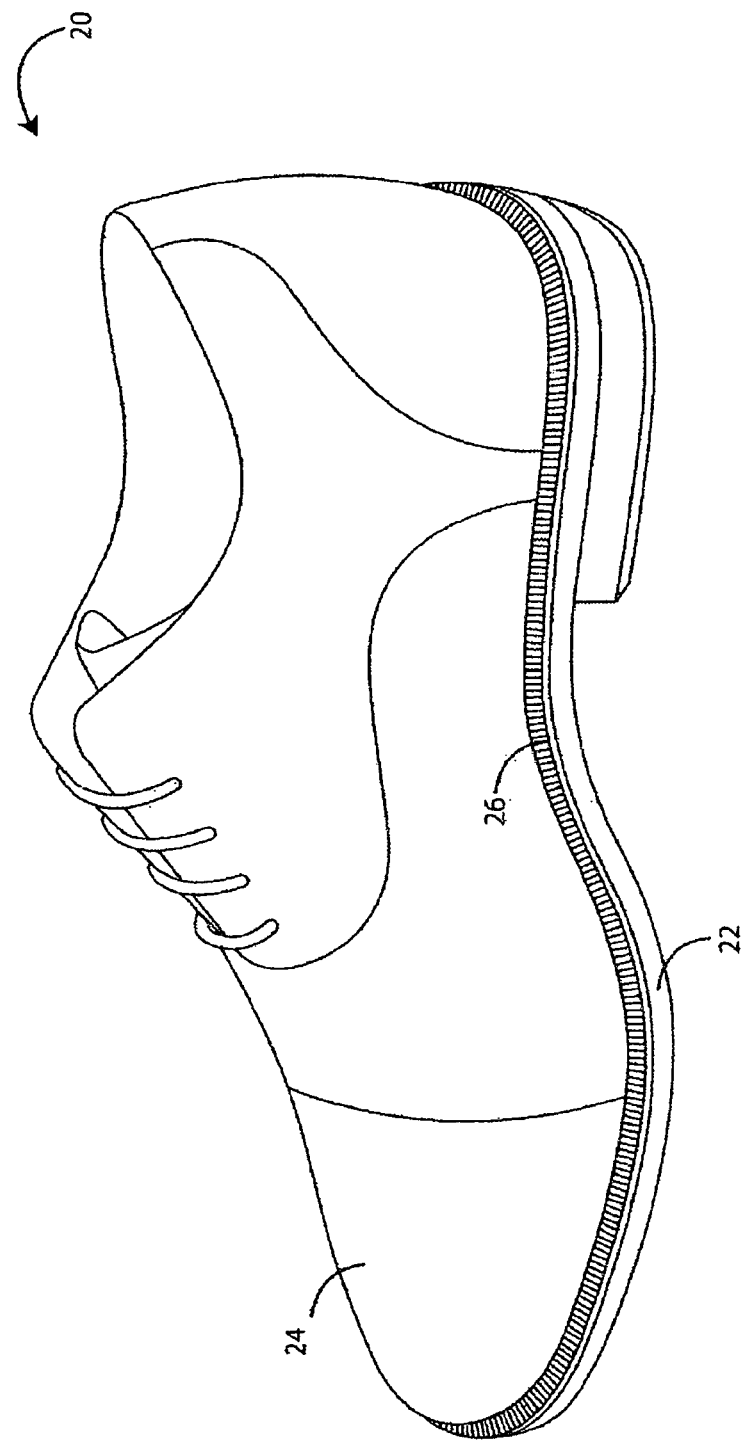
FIG. 1 is a perspective view of an embodiment of a shoe in accordance with the present invention, the shoe including a sole, an upper, and a welt.
Figure 2:
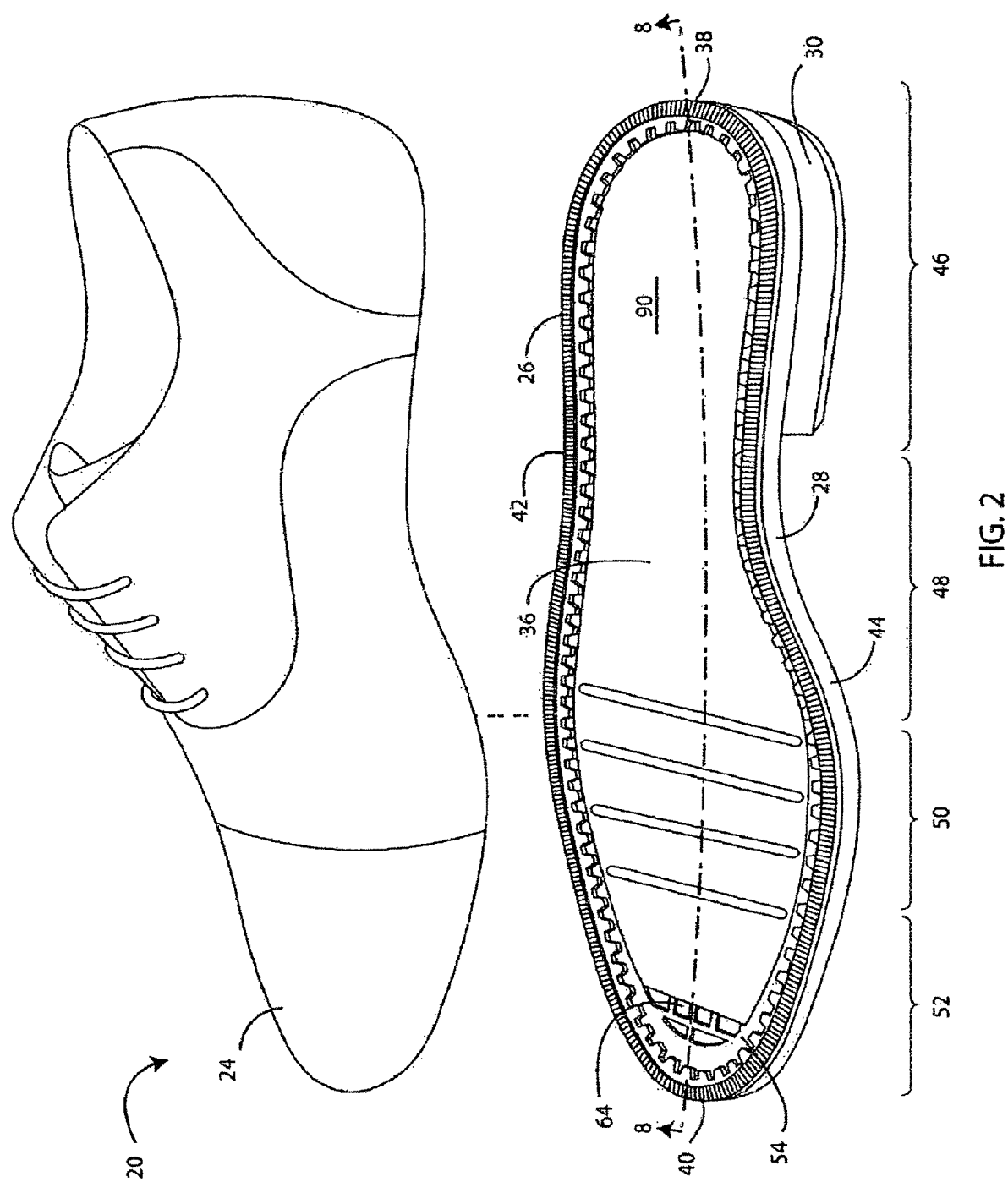
FIG. 2 is perspective view of the shoe shown in FIG. 1, the upper being exploded from the sole and welt.
Figure 3:
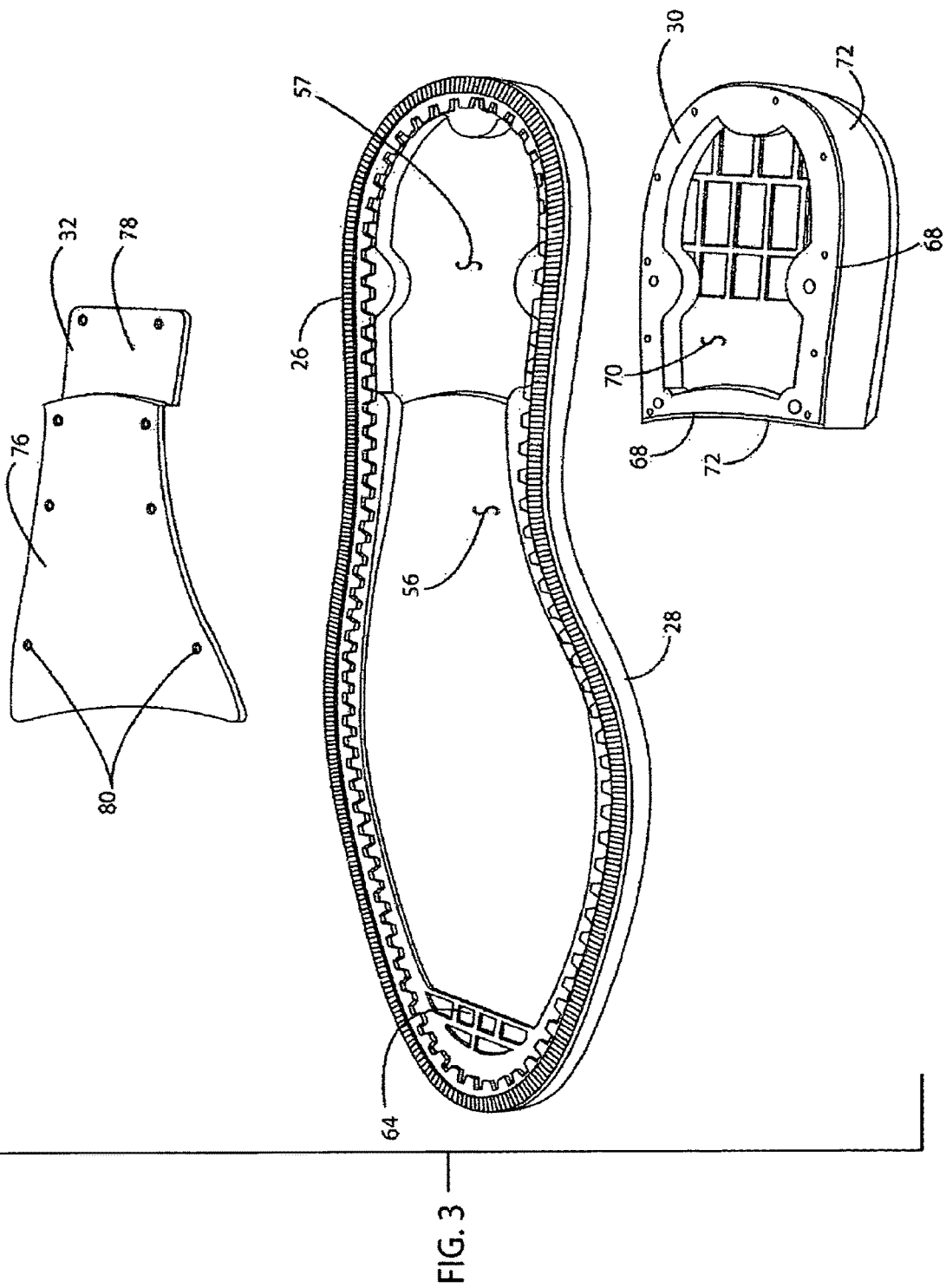
FIG. 3 is an exploded perspective view of a lower sole member and a heel member of the sole of FIG. 2.
Figure 4:
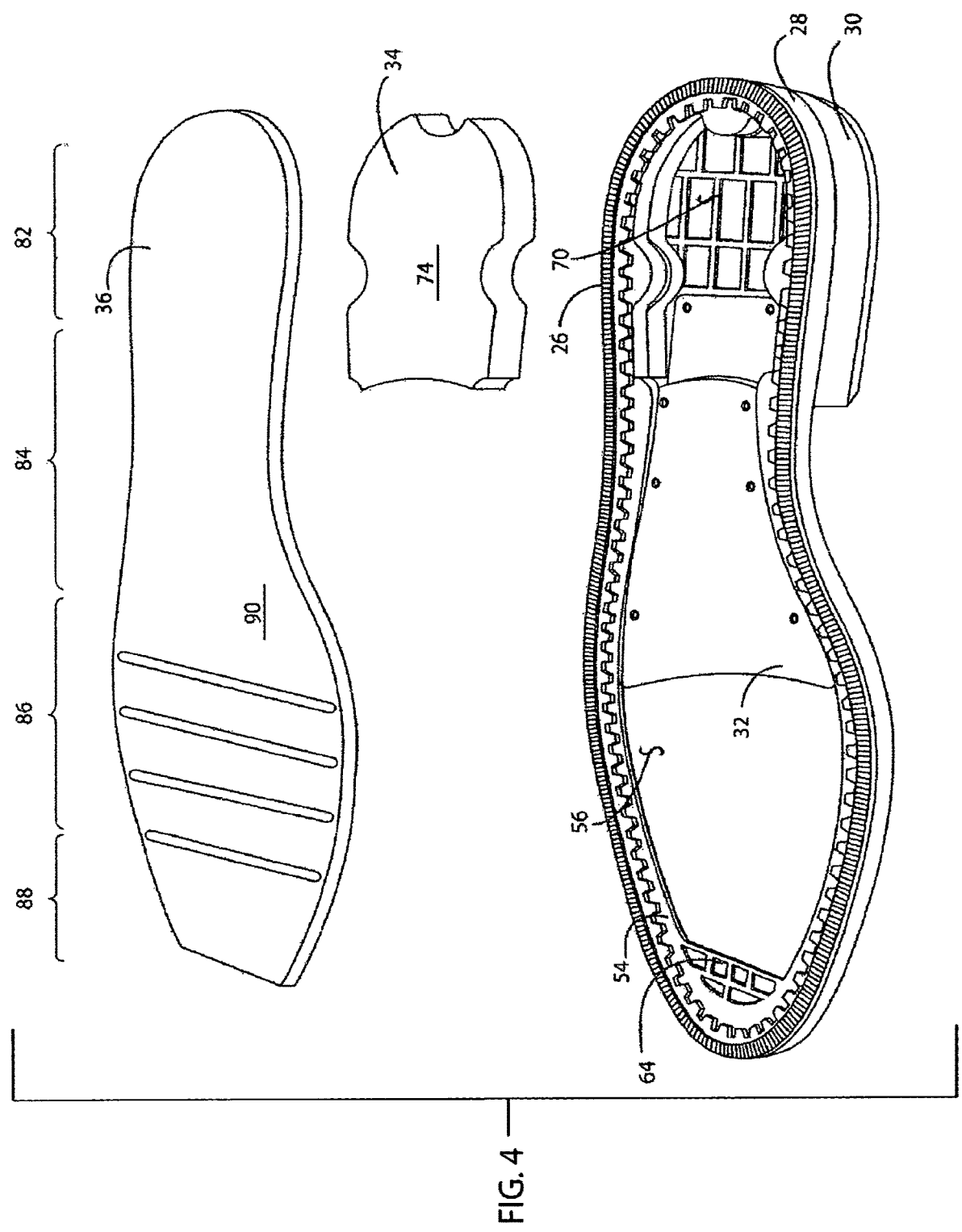
FIG. 4 is an exploded perspective view of the sole shown in FIG. 2, the sole including a foot pad and a heel cushion.

Reference numerals in the written specification and in the drawing figures indicate corresponding items.

DETAILED DESCRIPTION

An embodiment of a shoe in accordance with the present invention is indicated by reference numeral 20 in FIGS. 1-8. The shoe 20 comprises a sole, generally indicated at 22, an upper, generally indicated at 24, and a welt, generally indicated by 26. The upper 24 is secured to the sole 22. The sole 22 has a lower sole member 28, a heel member 30, a shank member 32, a heel cushion 34, and a foot pad 36. The sole 22 extends longitudinally from a sole heel end 38 to a sole toe end 40 and extends transversely from a sole lateral edge 42 to a sole medial edge 44. The sole 22 includes a heel region 46, a midfoot region 48, a ball region 50, and a toe region 52. The heel region 46 extends longitudinally from the sole heel end 38 to the midfoot region 48. The midfoot region 48 extends longitudinally from the heel region 46 to the ball region 50. The ball region 50 extends longitudinally from the midfoot region 48 to the toe region 52. The toe region 52 extends longitudinally from the ball region 50 to the sole toe end 40. The welt 26 is secured to at least one of the sole 22 and the upper 24.

Figure 7:
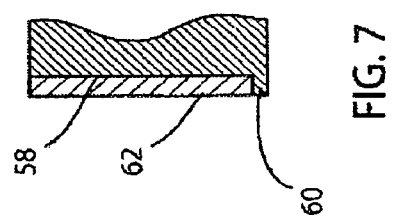
FIG. 7 is a cross-sectional view taken along the plane of line 7-7 of FIG. 5.
Figure 8:
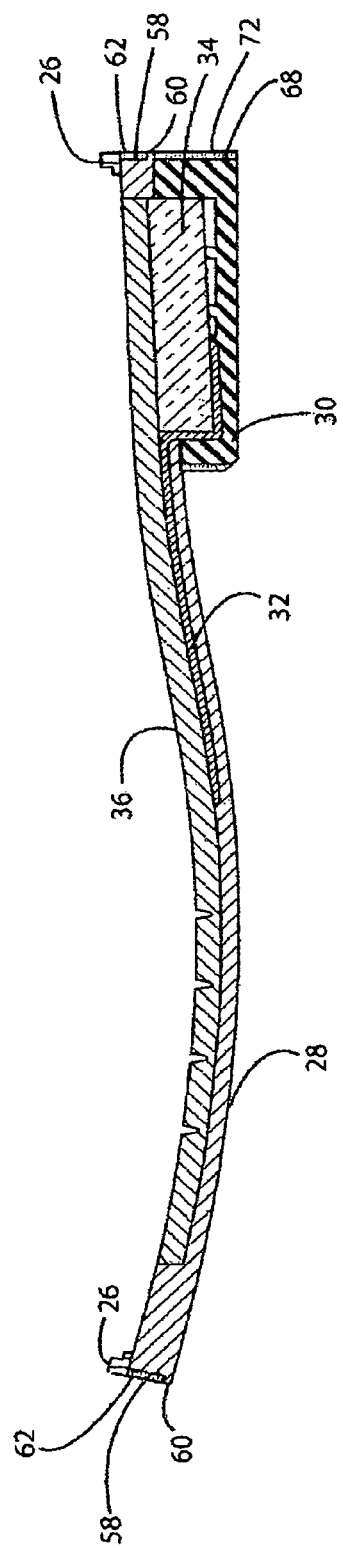
FIG. 8 is a cross-sectional view taken along the plane of line 8-8 of FIG. 2.

In the embodiment of FIGS. 1-8, the lower sole member 28 is of a molded construction. The lower sole member 28 is of a first material of a first durometer hardness, such as a thermoplastic polyurethane material having a durometer hardness in a range of 60 to 65 on a Shore A hardness scale. The lower sole member 28 extends from the sole heel end 38 to the sole toe end 40. The lower sole member 28 includes a top surface 54, a lower sole cavity 56, an outer peripheral surface 58, and a flange 60. The lower sole cavity 56 extends downwardly from the top surface 54. The sole 22 also includes a lower sole veneer portion 62. The lower sole veneer portion 62 traverses along the outer peripheral surface 58 of the lower sole member 28. As seen in FIG. 7 and FIG. 8, the flange 60 extends outwardly beyond the outer peripheral surface 58 to cover (and thereby protect and hide) the bottom edge of the lower sole veneer portion 62. A person of ordinary skill in the art would recognize that the flange 60 could be removed in the heel region 46 of the sole 22 because the heel member 30 covers (and thereby protects and hides) the bottom edge of the lower sole veneer portion 62. The welt 26 is adjacent the outer peripheral surface 58. The welt 26 is located such that a top edge of the lower sole veneer portion 62 cannot be seen when the lower sole member 28 is viewed from the top. The lower sole veneer portion 62 comprises natural leather, or synthetic leather, or wood, or some other suitable material. The lower sole member 28 further includes a web portion 64 in the toe region 52 and a through opening 57 in the heel region 46.

The web portion 64 comprises a plurality of recesses extending downwardly from the top surface 54. It is to be understood that the lower sole member 28 could be of a material other than a thermoplastic polyurethane.

In the embodiment of FIGS. 1-8, the heel member 30 is of a molded construction and is a one-piece member separate from the lower sole member 28. The heel member 30 is of a second material of a second durometer hardness, such as a thermoplastic polyurethane material having a durometer hardness in a range of 70 to 75 on a Shore A hardness scale. It is to be understood that the lower sole member 28 can be of the second material of the second durometer hardness rather than being of the first material of the first durometer hardness. The heel member 30 is in the heel region 46 and extends downwardly from the lower sole member 28. The heel member 30 includes a heel outer peripheral surface 68, an open top heel cavity 70, and a heel veneer portion 72. The heel cavity 70 is spaced from the heel outer peripheral surface 68, and the heel cushion 34 is in the heel cavity. The heel cushion 34 is made of a third material of a third durometer hardness, such as a polyurethane material having a durometer hardness in a range of 60 to 65 on a Shore A hardness scale. The second durometer hardness of the second material of the heel member 30 is greater than the third durometer hardness of the third material of the heel cushion 34. The heel cushion 34 includes an upper surface 74. The upper surface 74 is generally flush with a shank midfoot portion 76 of the shank member 32. The heel veneer portion 72 traverses along the heel outer peripheral surface 68. The heel veneer portion 72 comprises natural leather, synthetic leather, or wood, or some other suitable material. It is to be understood that the heel member 30 could be of a material other than a thermoplastic polyurethane and the heel cushion 34 could be of a material other than polyurethane.

The shank member 32 is of steel. It is to be understood the shank member 32 could be of a material other than steel, such as a plastic material having a durometer hardness of at least 80 on a Shore A hardness scale. The shank member 32 has the shank midfoot portion 76, a shank heel portion 78, and a plurality of shank openings 80. The shank midfoot portion 76 is in the lower sole cavity 56 and the shank heel portion 78 is in the heel cavity 70. The shank heel portion 78 is sandwiched between the heel cushion 34 and the heel member 30.

The foot pad 36 extends between the sole heel end 38 and the sole toe end 40 and has a heel pad portion 82, a midfoot pad portion 84, a ball pad portion 86, and a toe pad portion 88. The foot pad 36 is of a fourth material having a fourth durometer hardness, such as a polyurethane material having a durometer hardness in a range of 35 to 40 on a Shore A harness scale. The third durometer hardness of the third material of the heel cushion 34 is greater than the fourth durometer hardness of the fourth material of the foot pad 36. The polyurethane material of the foot pad 36 is a cured-in-place foam. The heel pad portion 82 overlies the heel cushion 34. The heel pad portion 82 is also in contact with the heel cushion 34. The midfoot pad portion 84 overlies the shank midfoot portion 76 and is located within at least some of the shank openings 80. The midfoot pad portion 84 is also in contact with the shank midfoot portion 76. The midfoot pad portion 84, the ball pad portion 86, and the toe pad portion 88 are in the lower sole cavity 56. The foot pad 36 has a top surface 90 in contact with the upper 24. In this embodiment, the foot pad 36 comprises only a single layer that is in contact with the upper 24 and the heel cushion 34. One of ordinary skill in the art would understand that the foot pad 36 could comprise multiple layers instead of a single layer. It is to be understood that the foot pad 36 could be of a material other than polyurethane.

Figure 9:
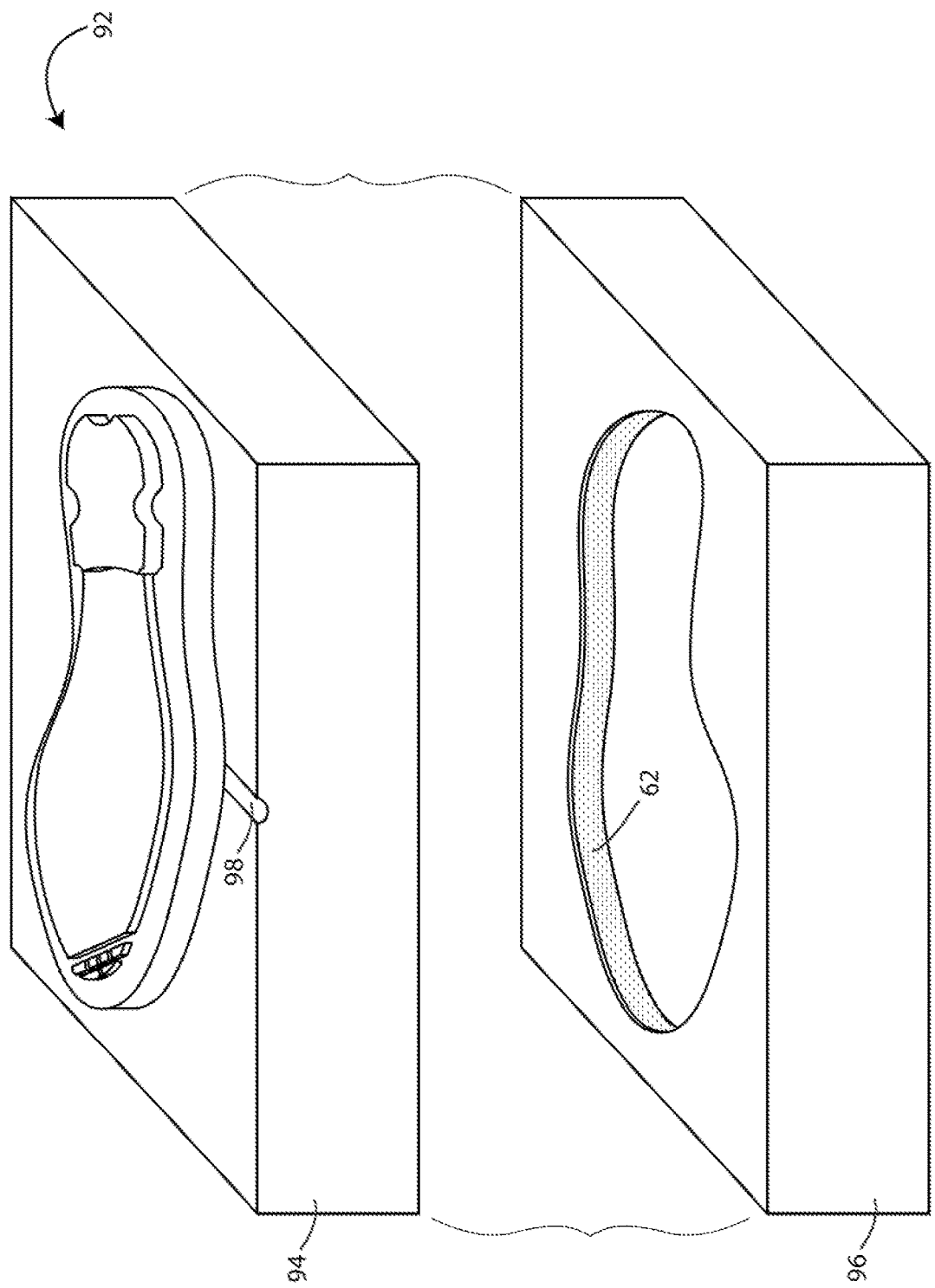
FIG. 9 is a mold for manufacturing a lower sole member of the type shown in FIGS. 5 and 6, the mold having upper and lower mold components.
Figure 10:
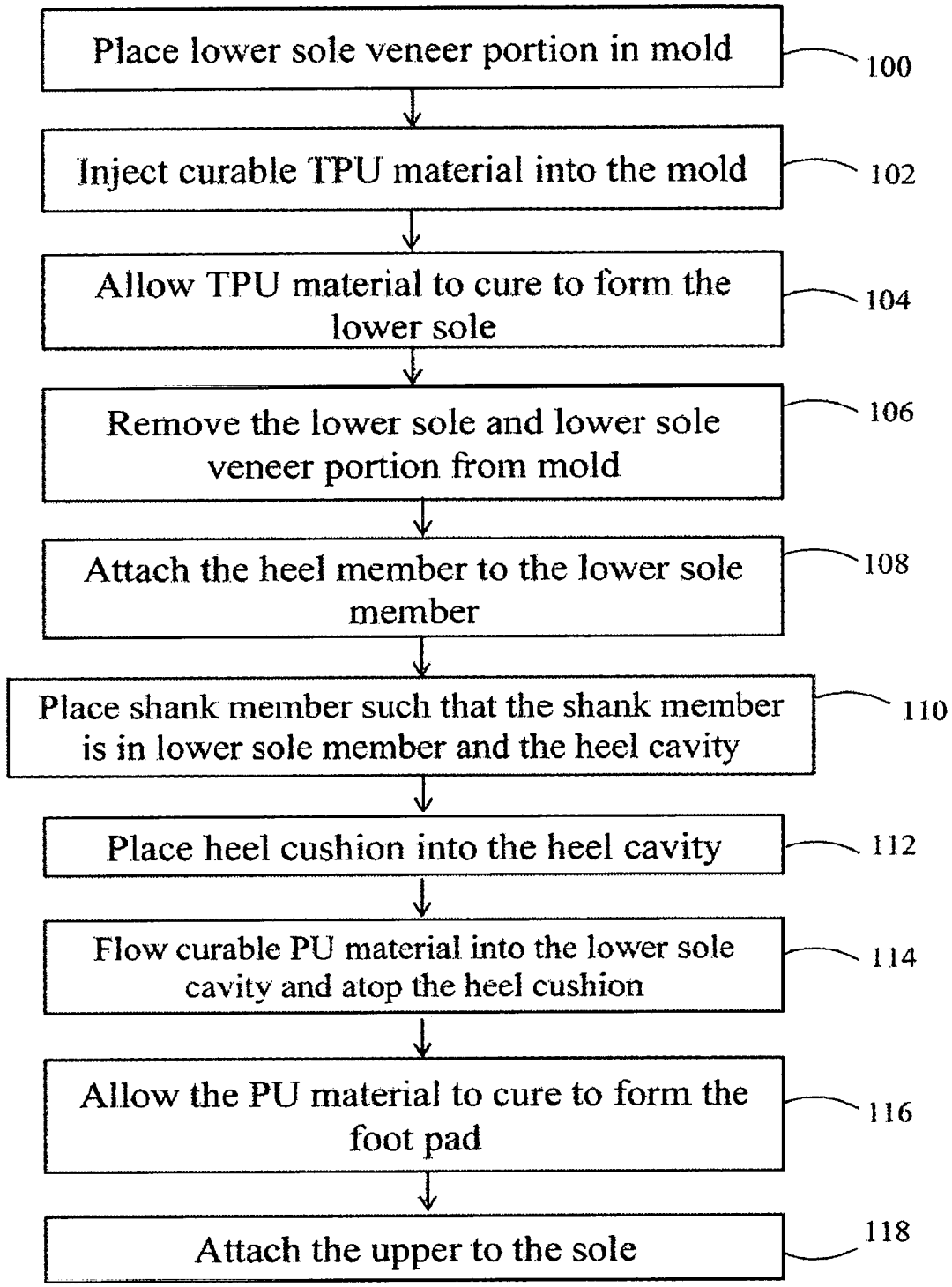
FIG. 10 is a flowchart illustrating the manufacturing process of the shoe of FIG. 2.

FIG. 9 shows a mold 92 of a shape to form the lower sole member 28. The mold 92 has an upper mold component 94 and a lower mold component 96. FIG. 10 is a flowchart illustrating the manufacturing of shoe 20. As indicated at box 100, the lower sole veneer portion 62 is placed in the lower mold component 96. The upper mold component 94 is stacked on the lower mold component 96, and a curable TPU material is injected into the mold 92 via a channel 98 (box 102). The TPU is allowed to cure to form the lower sole member 28 (box 104), and the lower sole veneer portion 62 and the lower sole member are removed from the mold 92 (box 106). At box 108, the heel member 30 is attached to the lower sole member 28 via a plurality of screws (not shown). The shank member 32 is placed relative to the heel member 30 and the lower sole member 28 such that the shank heel portion 78 is in the heel cavity 70 and the shank midfoot portion 76 is in the lower sole cavity 56 (box 110). The heel cushion 34 is inserted into the heel cavity 70 (box 112). A curable polyurethane is then made to flow into the lower sole cavity 56 and atop the heel cushion 34 (box 114). The curable polyurethane flows into at least some of the plurality of shank openings 80. The polyurethane is allowed to cure to form the foot pad 36, the foot pad being located within at least some of shank openings 80 (box 116). The upper 24 is attached to the sole 22 (box 118).

Figure 11:
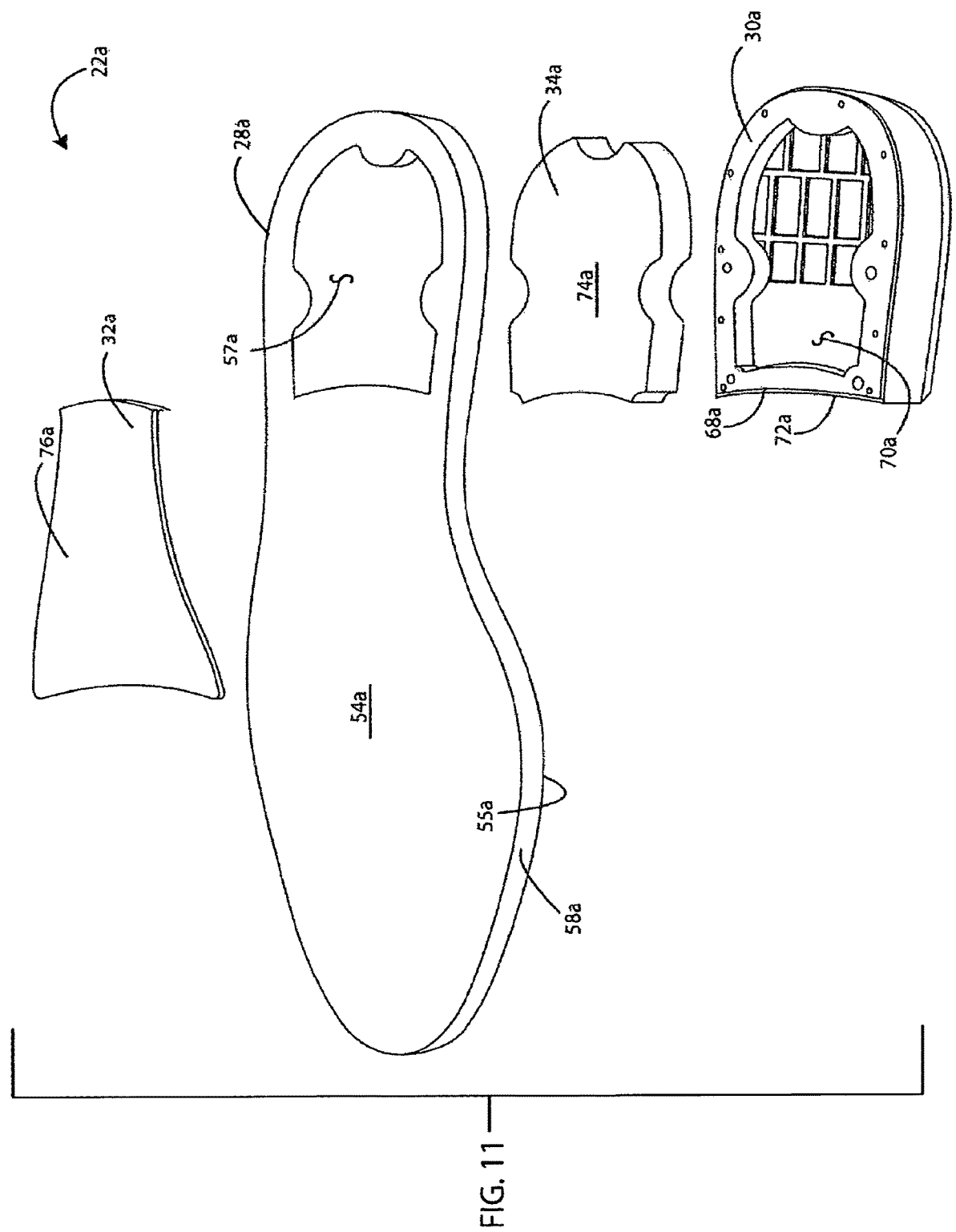
FIG. 11 is an alternative embodiment of a lower sole member for a shoe in accordance with the present invention.

FIG. 11 shows a sole 22a similar to the sole shown in FIG. 1-8, except that the sole 22a has an alternative embodiment of a lower sole member 28a and an alternative embodiment of a shank member 32a. For simplicity, the reference numbers for the elements of the sole 22a are the same as corresponding elements of the sole of FIGS. 1-8 except the reference numbers for the sole 22a contain a suffix "a". The lower sole member 28a is a leather sole having a top surface 54a, a bottom surface 55a, and an outer peripheral surface 68a. The lower sole member 28a also has a through opening 57a in the heel region of sole 22a. The opening 57a in the lower sole member 28a is spaced from the outer peripheral surface 58a. The heel member 30a is in the heel region and extends downwardly from the lower sole member 28a. The heel cavity 70a is spaced from the heel outer peripheral surface 68a and aligned with the opening 57a in the lower sole member 28a. The heel veneer portion 72a traverses along the heel outer peripheral surface 68a. The upper surface 74a of the heel cushion 34a is generally flush with the top surface 54a of the lower sole member 28a. The shank member 32a has a shank midfoot portion 76a in the midfoot region of sole 22a. The shank midfoot portion 76a overlies the lower sole member 28a. The heel cushion 34a is in the heel cavity 70a and in the opening 57a such that when an assembled shoe in accordance with the present invention uses sole 22a, the heel cushion, the shank member 32a, and the lower sole member 28a are in contact with the upper. It is to be understood, however, that additional layers could be between the heel cushion 34a, the shank member 32a, and the lower sole member 28a and the upper.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations.

What is claimed is:

1. A shoe comprising: a sole; and an upper secured to the sole; the sole extending longitudinally from a sole heel end to a sole toe end and extending transversely from a sole lateral edge to a sole medial edge, the sole including a heel region, a midfoot region, a ball region and a toe region, the heel region extending longitudinally from the sole heel end to the midfoot region, the midfoot region extending longitudinally from the heel region to the ball region, the ball region extending longitudinally from the midfoot region to the toe region, and the toe region extending longitudinally from the ball region to the sole toe end, the sole having a lower sole member, a heel member, a shank member, a heel cushion, and a foot pad, the lower sole member extending from the sole heel end to the sole toe end, the heel member being in the heel region and extending downwardly from the lower sole member, the heel member including a heel outer peripheral surface and an open top heel cavity, the open top heel cavity being spaced from the heel outer peripheral surface, the lower sole member including a top surface and a lower sole cavity extending downwardly from the top surface, the shank member having a shank midfoot portion and a shank heel portion, the shank midfoot portion being in the lower sole cavity and the shank heel portion being in the open top heel cavity, the heel cushion being in the open top heel cavity, the shank heel portion being sandwiched between the heel cushion and the heel member, the foot pad extending between the sole heel end and the sole toe end and having a heel pad portion, a midfoot pad portion, a ball pad portion, and a toe pad portion, the heel pad portion overlying and being in contact with the heel cushion, the midfoot pad portion overlying and being in contact with the shank midfoot portion, the midfoot pad portion, the ball pad portion, and the toe pad portion being in the lower sole cavity, the foot pad having a top surface in contact with the upper.

2. The shoe as set forth in claim 1 wherein the lower sole member has an outer peripheral surface, and wherein the sole further comprises a veneer, the veneer comprising a lower sole veneer portion and a heel veneer portion, the lower sole veneer portion traversing along the outer peripheral surface of the lower sole member, the heel veneer portion traversing along the heel outer peripheral surface.

3. The shoe as set forth in claim 2 wherein the lower sole veneer portion comprises either natural leather or synthetic leather.

4. The shoe as set forth in claim 3 wherein the heel veneer portion comprises either natural leather or synthetic leather.

5. The shoe as set forth in claim 2 wherein the heel veneer portion comprises wood.

6. The shoe as set forth in claim 2 wherein the lower sole member is of a molded construction and wherein the heel member is of a molded construction.

7. The shoe as set forth in claim 6 wherein the heel member is a one-piece member separate from the lower sole member.

8. The shoe as set forth in claim 6 wherein the heel member is of a first material of a first durometer hardness, the heel cushion is of a second material of a second durometer hardness, and the foot pad is of a third material of a third durometer hardness, the first durometer hardness being greater than the second durometer hardness, the second durometer hardness being greater than the third durometer hardness.

9. The shoe as set forth in claim 8 wherein the lower sole member is of the first material.

10. The shoe as set forth in claim 8 wherein the foot pad comprises a single layer, the single layer of the foot pad being in contact with the upper and the heel cushion.

11. The shoe as set forth in claim 10 wherein the single layer of the foot pad is in contact with the shank midfoot portion and the lower sole member.

12. The shoe as set forth in claim 11 wherein the third material is a cured-in-place foam.

13. The shoe as set forth in claim 11 wherein the lower sole veneer portion comprises natural leather and wherein the heel veneer portion comprises natural leather.

14. The shoe as set forth in claim 8 further comprising a welt, the welt being adjacent the outer peripheral surface of the lower sole member, the welt being secured to at least one of the sole and the upper.

15. A method of making the shoe as set forth in claim 2, the method comprising:
placing the lower sole veneer portion in a mold;
injecting a curable first material into the mold, the mold being of a shape to form the lower sole member;
allowing the first material to cure to form the lower sole member;
removing the lower sole veneer portion and the lower sole member from the mold.

16. A method as set forth in claim 15 further comprising:
attaching the heel member to the lower sole member;
placing the shank member relative to the heel member and the lower sole member such that the shank heel portion is in the open top heel cavity and the shank midfoot portion is in the lower sole cavity;
inserting the heel cushion into the open top heel cavity, the heel cushion being of a second material different from the first material;
causing a curable third material to flow into the lower sole cavity and atop the heel cushion;
allowing the third material to cure to form the foot pad;
attaching the upper to the sole.

17. The shoe as set forth in claim 1 wherein the lower sole member is of a molded construction and wherein the heel member is of a molded construction.

18. The shoe as set forth in claim 17 wherein the heel member is of a first material of a first durometer hardness, the heel cushion is of a second material of a second durometer hardness, and the foot pad is of a third material of a third durometer hardness, the first durometer hardness being greater than the second durometer hardness, the second durometer hardness being greater than the third durometer hardness.

19. The shoe as set forth in claim 18 wherein the lower sole member is of the first material.

20. The shoe as set forth in claim 1 wherein the foot pad comprises a single layer, the single layer of the foot pad being in contact with the upper and the heel cushion.

21. The shoe as set forth in claim 20 wherein the single layer of the foot pad is in contact with the shank midfoot portion and the lower sole member.

22. The shoe as set forth in claim 1 wherein the shank midfoot portion comprises a plurality of shank openings, the midfoot pad portion being located within at least some of the shank openings.

23. A shoe comprising: a sole; and an upper secured to the sole; the sole extending longitudinally from a sole heel end to a sole toe end and extending transversely from a sole lateral edge to a sole medial edge, the sole including a heel region, a midfoot region, a ball region and a toe region, the heel region extending longitudinally from the sole heel end to the midfoot region, the midfoot region extending longitudinally from the heel region to the ball region, the ball region extending longitudinally from the midfoot region to the toe region, and the toe region extending longitudinally from the ball region to the sole toe end, the sole having a lower sole member, a heel member, a shank member, a heel cushion, and a foot pad, the lower sole member extending from the sole heel end to the sole toe end, the heel member being in the heel region and extending downwardly from the lower sole member, the heel member including a heel outer peripheral surface and an open top heel cavity, the open top heel cavity being spaced from the heel outer peripheral surface, the lower sole member including a top surface and a lower sole cavity extending downwardly from the top surface, the shank member having a shank midfoot portion and a shank heel portion, the shank midfoot portion being in the lower sole cavity and the shank heel portion being in the open top heel cavity, the heel cushion being in the open top heel cavity, the shank heel portion being sandwiched between the heel cushion and the heel member, the foot pad extending between the sole heel end and the sole toe end and having a heel pad portion, a midfoot pad portion, a ball pad portion, and a toe pad portion, the heel pad portion overlying the heel cushion and the midfoot pad portion overlying the shank midfoot portion, the midfoot pad portion, the ball pad portion, and the toe pad portion being in the lower sole cavity, the foot pad having a top surface in contact with the upper.

* * * * *